United States Patent [19]

F'Geppert

[11] Patent Number: 4,596,540

[45] Date of Patent: Jun. 24, 1986

[54] DRIVE BELT CONSTRUCTION

[75] Inventor: Erwin F'Geppert, Novi, Mich.

[73] Assignee: The United States of America as represented by the Secretary of the Army, Washington, D.C.

[21] Appl. No.: 754,717

[22] Filed: Jul. 15, 1985

[51] Int. Cl.⁴ ............................................. F16G 7/04
[52] U.S. Cl. ................... 474/253; 474/254; 24/31 V; 24/306
[58] Field of Search .................. 474/254–259, 474/261–265, 250, 253; 24/31 V, 306

[56] References Cited

U.S. PATENT DOCUMENTS

| 1,457,569 | 6/1923 | Gusdorf | 474/254 X |
| 2,350,861 | 6/1944 | Argy et al. | 474/254 X |
| 3,342,656 | 9/1967 | Papageorges | 474/254 X |
| 3,383,738 | 5/1968 | Fox et al. | 24/306 |
| 3,403,429 | 10/1968 | Smith | 24/306 |
| 3,461,511 | 8/1969 | Perina | 24/31 V |
| 4,158,906 | 6/1979 | Watson | 24/306 |
| 4,311,756 | 6/1982 | Brooksbank | 474/254 X |

Primary Examiner—Stephen J. Novosad
Assistant Examiner—Thuy M. Bui
Attorney, Agent, or Firm—John E. McRae; Robert P. Gibson; Peter A. Taucher

[57] ABSTRACT

A drive belt formed as a discontinuous belt structure with specially-formed end connectors. The faces of the end connectors have large numbers of miniature interlockable hooking elements thereon for enabling the ends of the belt structure to be formed into a usable endless drive belt. The belt structure can be cut to varying lengths, such that one belt structure can be used to form a variety of different length belts. The belt ends can be connected together after the belt structure has been installed around a pulley system.

1 Claim, 6 Drawing Figures

DRIVE BELT CONSTRUCTION

GOVERNMENT INTEREST

The invention described herein may be manufactured, used, and licensed by or for the Government for governmental purposes without payment to me of any royalty thereon.

BACKGROUND

This invention relates to power-transmitting drive belts, usable for example in automotive engines, power lawn mowers, electric motor-driven fans, washing machine pumps, clothes dryer drums, etc. When used in an automotive engine, the belt transmits the engine's power to auxiliary units, such as an alternator, power steering pump, water pump, power brake pump and air conditioning compressor. The inventive belt is a discontinuous belt having special end connectors for forming a continuous endless belt structure of selective overall length.

The belt structure can be used as an emergency replacement for a broken belt, to thus temporarily service the power drive system until a new permanent belt can be obtained. Alternately the inventive belt might be used as a variable length belt structure, providing a range of belt sizes (e.g., 27 inch length or 28 inch length from the same basic belt unit). In the latter usage the belt design could be used to reduce the number of belt sizes in inventory. The "adjustable length" nature of the belt design permits in-service adjustment of the belt to compensate for belt stretching, as occurs during normal operations.

It is already known to provide variable length belts for temporary (emergency) use. One such belt consists of a hollow flexible tube joinable at its ends by means of a short ribbed rod telescoped into the tube ends. The belt can be mounted on a vehicle without tools and without adjusting the auxiliary drive units to take up belt slack. The belt may be trimmed to fit different applications.

A primary disadvantage of this prior art belt is its limited strength and propensity for belt slippage. The belt's circular cross-section does not transmit power as efficiently as a belt having a cross-section mated to the pulley it will be used on. Also, the tube-style belt does not flex evenly about the ribbed rod connector. It is believed that stress on the rod as the tubular belt moves around each pulley would cause the tube to separate from the rod and lengthen the belt. Any lengthening of the belt would cause belt slippage and degraded performance.

To adequately transmit power from power source to the driven unit(s), the belt should have a cross-section mated to the pulley design, e.g., a V cross-section or double V cross-section or flat rectangular cross-section. V-shaped belts transmit power through their nonparallel sides. Flat belts transmit power through their inner faces. In some cases, both the inner side and the outer side of the belt engage a pulley to transmit power; flat belts or double V cross-sectioned belts are often used in such situations.

The known temporary belts, such as the tubular type discussed above, do not operate efficiently on conventional pulleys. The circular cross-section of the tubular belt does not provide sufficient surface area in contact with the pulley to efficiently transmit power. The belt tends to slide and slip the pulley, with consequent frictional heat build-up and belt deteriorization.

Temporary belts having clasp or buckle type connectors have been used. However they cannot be used in place of a double sided belt because the surface with the clasp or buckle will tend to bind in the pulley. If the clasp or buckle is made of hard material, it may nick and damage the pulley. Even a small nick in the pulley can cause excessive belt wear and lead to premature failure.

SUMMARY OF THE INVENTION

In one from of my invention the power-transmitting drive belt comprises an elongated belt member of V cross-section. The belt member has opposite end areas thereof adapted to be connected together to form an endless belt. Each end area of the belt member is of reduced cross-section to form an elongated interior flat connector face extending lengthwise closely adjacent to the belt member cross-sectional axis. Pile materials having miniature hooking elements are adhered to each connector face.

These hooking elements take the form of miniature loops and cooperating miniature hooks. When the connector faces are mated together, the miniature loops interengage with the miniature hooks, to thus form a connection resistant to shear separation lengthwise of the belt. The exterior surfaces of the belt member are co-extensive with the belt member length so that when the belt member assumes it endless configuration the belt member exterior surfaces are continuous, without interruptions at the joined end areas of the belt member.

THE DRAWNGS

FIG. 1 is a side elevational view of a belt structure embodying my invention.

FIG. 2 is a sectional view on line 2—2 in FIGS. 1 and 3.

FIG. 3 is an enlarged fragmentary sectional view illustrating certain end connectors used in the FIG. 1 structure.

FIG. 4 is a sectional view taken along line 4—4 in FIG. 3.

FIG. 5 is a fragmentary view of the FIG. 1 belt member, shown during the process of assembling the belt into an endless configuration.

FIG. 6 is a cross-sectional view taking through another belt member constructed according to my invention.

Figure 1:
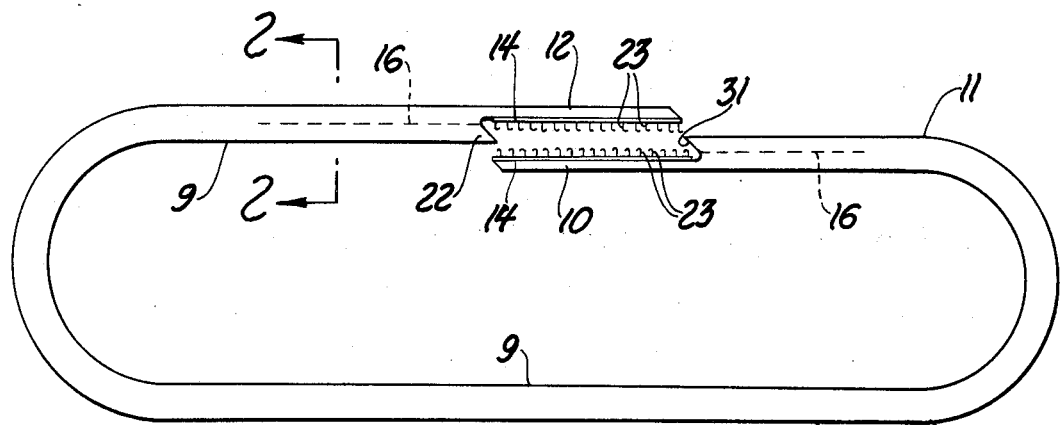
FIG. 1 is a side elevational view of a belt member 8 constructed according to my invention. Member 8 has an inner exterior flat surface 9, outer exterior flat surface 11, and two exterior side surfaces 13 and 15 connecting the two surfaces 9 and 11.
Figure 3:
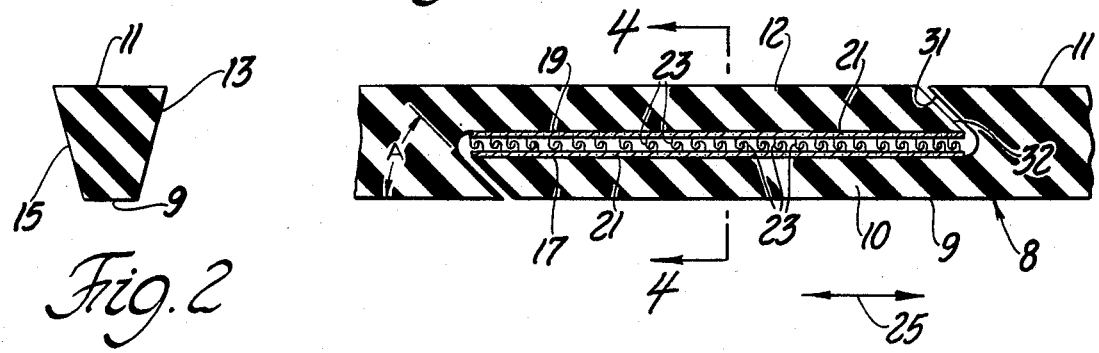
Figure 2:
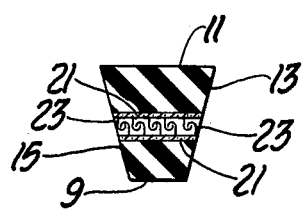
As seen in FIGS. 2 and 4, the belt member has a V cross-section, enabling side surfaces 13 and 15 to have driving contact with V-groove surfaces on conventional pulleys (not shown). Opposite end areas 10 and 12 of the belt member are each slightly less than half as thick as the thickness of the main body portion belt member 8. End areas 10 and 12 define elongated interior flat connector faces 17 and 19. The term "interior" is here used to mean locations within the cross-sectional profile dimension of the belt member. In this sense the term "exterior" is used to reference the aforementioned belt member surfaces 9, 11, 13 and 15, i.e. surfaces defining the external cross-sectional dimension of the belt member.
Figure 4:

Each connector face 17 or 19 has adhered thereon a length of pile material 14 of the "hook and loop fastener" type. Pile material 14 is commercially available from Velcro Corp, New York, N.Y., under the trademark Velcro. The pile material is described in various U.S. Patents, notably U.S. Pat. No. 3,009,235 issued to G. DeMestral on Nov. 21, 1961.

Each pile material 14 includes a tape or fabric sheet 21 formed for example of woven nylon threads or other flexible material. An adhesive is applied to one face of each fabric sheet to permanently bond the sheet to face 17 or 19 of the respective belt member end area 10 or 12.

Each one of the fabric sheets 21 has a pile covering 23 woven onto its threads to form a large multiplicity of closely spaced miniature hooking elements. The hooking elements in the different pile coverings are designed to interengage with one another, to thus form gripper connections between end areas 10 and 12 that are resistant to shear forces in the arrow 25 direction. The hooking elements in the different pile coverings are constructed differently to achieve the desired gripment connections. One set of hooking elements may take the form of miniature hooks, whereas the other set of hooking elements may take the form of miniature loops. The hooks and loops extend normal to their respective fabric sheets 21 so that when the two belt member end areas 10 and 12 are manually pressed together the hooking elements will interengage in the desired gripment fashion.

Aforementioned U.S. Pat. No. 3,009,235 describes the hooking elements, and process of making same. Each assembly 14, comprised of fabric sheet 21 and its pile covering 23, is commercially available from Velcro Corp of New York, N.Y. The attached drawings illustrate the pile "hook and loop fastener" material schematically, rather than structurally.

The juncture between the main body of belt member 8 and each end areas 10 and 12 defines a shoulder surface 31 that extends transversely to the belt member longitudinal axis 16. Each shoulder surface 31 extends at an acute angle A to the associated exterior surface 9 or 11 of the belt member, such that when the end areas 10 and 12 are mated together each shoulder surface will overlie tip 32 on the associated end area abutting the respective shoulder surface. Acute angle A is preferably about forty five degrees.

Figure 5:
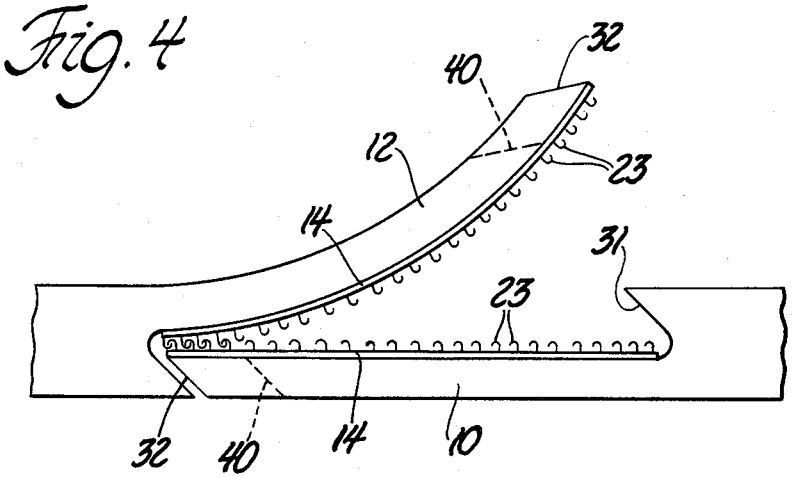

The end areas 10 and 12 are initially mated together with tips 32 as close as possible to shoulders 31, to achieve a desired overlapment therebetween. If end areas of the belt member are flexed or bent slightly during the connection process, as shown for example in FIG. 5, the process of achieving such overlapment may be somewhat facilitated. Preferably the tip of one end area 10 (or 12) is inserted into a corner at shoulder 31 on the other end section of the belt member (as in FIG. 5). End area 12 (or 10) is then forced toward the other end area to cause the miniature hooking elements on the pile materials 14 to interengage. The tip area on the other end area 12 (or 10) is then forced into the corner at shoulder 31 on end area 10 (or 12). The process is facilitated by bending (flexing) the belt material, as indicated generally in FIG. 5. A screw driver or similar implement may be necessary to force the tip of end area 12 into position underneath shoulder 31 on end area 10.

During service of the belt on the non-illustrated pulleys the shoulders 31 act as obstructions to prevent the belt end areas from separating or peeling away from one another, e.g. due to the effects of centrifugal force. Separation of one pile covering (hooking elements) from the other pile covering can only take place as a peel-away movement of one pile covering, starting at a tip end of the pile covering. Therefore the locking-obstruction action of shoulders 31 offer good assurance that the belt will remain operative when placed in service on a set of pulleys.

As previously noted, the belt structure is designed to be of variable length, such that it can be used to form different overall length belts (e.g. 27 inch or 28 inch). The belt in its as-built configuration cannot be lengthened. However, it can be shortened. The shortening process involves cutting off parts of end areas 10 and 12, as indicated by dashed lines 40 in FIG. 5. Each cutting line is made to be parallel with the original angulation on tip area 32.

The maximum magnitude of the shortening action possible (using this cutting process) is related to the original lengths of end areas 10 and 12. For example, if end areas 10 and 12 are each four inch long the maximum amount which the belt can be shortened is about three inch. If three inch length is removed from each end area 10 or 12 the end areas are then each one inch long. It is believed that one inch is about the minimum length that each end area 10 or 12 could have and still provide sufficient hooking element surface engagement.

As previously noted, the "variable belt length" feature can be used for different aims or objectives, e.g. to reduce the number of belt sizes in inventory, and/or to compensate for belt stretch experienced during service.

Figure 6:
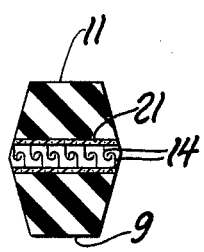

Belts having the described "miniature hooking element" connector means 14 can be constructed in various different cross-sections. FIGS. 1 through 4 show a belt having a V cross-section. FIG. 6 shows a belt having a double V cross-section. It would also be possible to build a belt (having the described connector means 14) with a flat rectangular cross-section.

Whatever the belt cross-section, the belt should be constructed so that the exterior side surfaces 9, 11, 13 and 15 are continued onto the end areas 10 and 12, i.e. that side surfaces 9, 11, 13 and 15 are coextensive with the total belt member length, such that when the belt member assumes its endless configuration the belt member exterior surfaces are continuous, without interruptions at the joined end areas of the belt member.

It is also desirable that end areas 10 and 12 be dimensioned so that each end areas has approximately the same cross-sectional area, in order to prevent (as far as possible) breakage of one end area or the other due to tensile loadings. In most cases this means that each connector face 17 or 19 is located closely adjacent to the belt member cross-sectional axis 16.

It is also believed necessary to orient connector faces 17 and 19 so that during service the pile materials 14 flex in planes normal to the planes taken by fabric sheets 21. These tapes or sheets can readily bend or flex in planes normal to their at-rest planes; they cannot readily flex or twist in their own planes (they tend to buckle in such planes). Connector faces 17 and 19 are preferably oriented to be in planes parallel to the planes taken by the inner flat surface 9 of the belt (rather than normal to surface 9).

I wish it to be understood that I do not desire to be limited to the exact details of construction shown and described for obvious modifications will occur to a person skilled in the art, without departing from the spirit and scope of the appended claims.

I claim:

1. A power-transmitting drive belt of the V-type, comprising an elongated flexible belt member having similarly-constructed opposite end areas thereof adapted to be connected together to form an endless belt; said belt member having an inner exterior flat surface (9) an outer exterior flat surface (11), and two exterior side surfaces; said exterior side surfaces being designed to engage pulley surfaces to transmit the drive forces; the material circumscribed by said exterior surfaces defining the belt cross section; each end area of the belt member being of reduced cross section to define an elongated interior flat connector face (17 or 19) extending parallel to one of the aforementioned exterior flat surfaces (9 or 11); each connector face being located closely adjacent to a mid plane taken through the belt member cross section;

- a flexible fabric sheet (14) permanently adhered to each flat connector face, each sheet being coextensive with the associated connector face; and a multiplicity of miniature hooking elements woven into each fabric sheet to define a pile covering on the otherwise exposed sheet face;

the hooking elements in one of the pile coverings taking the form of miniature loops, and the hooking elements in the other pile covering taking the form of miniature hooks; the hooking elements extending generally normal to the respective fabric sheets, whereby when the connector faces are mated together the miniature loops interengage with the miniature hooks, to thus form a connection resistant to shear separation lengthwise of the belt;

the aforementioned exterior surfaces of the belt member being coextensive with the belt member length, whereby when the belt member assumes its endless configuration the belt member exterior surfaces are continuous without interruptions or abrupt contour changes at the joined end areas of the belt member;

the tip surface (32) of each end area extending at an angle of approximately forty five degrees to the associated exterior surface of the end area;

the juncture between the main body of the belt member and each belt member end area defining a shoulder surface (31) extending transversely to the belt member longitudinal axis; each shoulder surface (31) extending at an angle of approximately forty five degrees to an associated exterior surface of the belt member; the direction of each shoulder surface being such that it overlies the tip of an associated belt member end area abutting the shoulder surface, thereby precluding the mated belt member end areas from peeling away from one another in directions normal to the belt member longitudinal axis.

* * * * *